(12) United States Patent
Kim

(10) Patent No.: US 12,364,959 B2
(45) Date of Patent: Jul. 22, 2025

(54) APPARATUS FOR REMOVING THERMAL STRATIFICATION GENERATED BY TURBULENT PENETRATION BY USING ROTATION OF PIPE WALL

(71) Applicant: KEPCO ENGINEERING & CONSTRUCTION COMPANY, INC., Gyeongsangbuk-do (KR)

(72) Inventor: Kwang Chu Kim, Gimcheon-si (KR)

(73) Assignee: KEPCO ENGINEERING & CONSTRUCTION COMPANY INC., Gimcheon-si (KR)

( * ) Notice: Subject to any disclaimer, the term of this patent is extended or adjusted under 35 U.S.C. 154(b) by 865 days.

(21) Appl. No.: 17/573,507

(22) Filed: Jan. 11, 2022

(65) Prior Publication Data
US 2022/0226787 A1    Jul. 21, 2022

(30) Foreign Application Priority Data
Jan. 18, 2021    (KR) .................. 10-2021-0006816

(51) Int. Cl.
*B01F 27/50*    (2022.01)
*F15D 1/00*    (2006.01)
*F15D 1/02*    (2006.01)

(52) U.S. Cl.
CPC ............ *B01F 27/50* (2022.01); *F15D 1/0065* (2013.01); *F15D 1/007* (2013.01)

(58) Field of Classification Search
CPC .... B01F 27/50; F04D 1/02; F04D 1/04; F16L 55/00; F16L 27/08; F16L 27/125; F15D 1/0065; F15D 1/007
See application file for complete search history.

(56) References Cited

U.S. PATENT DOCUMENTS 4,054,507 A * 10/1977 Pouska .................. B01D 33/11
406/197
4,790,568 A * 12/1988 Skibowski ............ B67D 7/002
285/27
(Continued)

FOREIGN PATENT DOCUMENTS

JP    H01158124 A  *  6/1989
JP    H06-063258        8/1994
(Continued)

OTHER PUBLICATIONS

Korean Office Action (Application No. 2021-0006816), mailed Jun. 19, 2022 (8pages).

*Primary Examiner* — Elizabeth Insler
(74) *Attorney, Agent, or Firm* — NIXON PEABODY LLP; Jeffrey L. Costellia

(57) ABSTRACT

Provided is an apparatus for removing thermal stratification generated by turbulent penetration by using a rotation of a pipe wall. The apparatus removes thermal stratification formed in a branch pipe branching from a main pipe through which a high-temperature fluid flows, the apparatus including: a connection body portion including a hollow first body and a hollow second body, the first body being coupled to one side of the branch pipe, and the second body being spaced apart from the first body and connected to other side of the branch pipe; and a hollow rotating part between the first body and the second body, the rotating part rotating around a center of the branch pipe.

5 Claims, 7 Drawing Sheets

(56) References Cited

U.S. PATENT DOCUMENTS 5,505,594 A * 4/1996 Sheehan ................. F04D 13/02
                                                                           415/72
9,725,789 B2    8/2017 Nam et al.

FOREIGN PATENT DOCUMENTS

| JP | 6118315 | 4/2017 | |
|----|---------|--------|---|
| KR | 10-0729215 | 6/2007 | |
| KR | 2012-0001413 | 1/2012 | |
| KR | 20120001413 A * | 1/2012 | ............... G21C 1/09 |

* cited by examiner

APPARATUS FOR REMOVING THERMAL STRATIFICATION GENERATED BY TURBULENT PENETRATION BY USING ROTATION OF PIPE WALL

CROSS-REFERENCE TO RELATED APPLICATION

This application is based on and claims priority under 35 U.S.C. § 119 to Korean Patent Application No. 10-2021-0006816, filed on Jan. 18, 2021, in the Korean Intellectual Property Office, the disclosure of which is incorporated by reference herein in its entirety.

BACKGROUND

1. Field

The present disclosure relates to an apparatus for removing thermal stratification generated by turbulent penetration by using a rotation of a pipe wall, and more particularly, to an apparatus for removing thermal stratification generated by turbulence penetrating into a branch pipe by using a rotation of a pipe wall.

2. Description of the Related Art

The present disclosure relates to an apparatus for removing thermal stratification generated by penetration of turbulent eddies from a main pipe through which a high-temperature and high-flow fluid flows into a dead-end branch pipe in various industrial plants.

In detail, as shown in FIG. 1, when the branch pipe is coupled to the main pipe through which the fluid flows, and the branch pipe is isolated by a valve, turbulent eddies penetrate into the branch pipe at an initial stage of plant operation. Such turbulent penetration generates thermal stratification in a horizontal pipe portion of an elbow pipe, as shown in FIG. 2.

Such a thermal stratification phenomenon may generate a bending stress due to a difference in the thermal expansion between the upper end lower parts of a pipe wall, thereby causing serious deformation of the pipe and a support. In particular, when the thermal stratification phenomenon repeats periodically, cracks due to thermal fatigue may occur. In the case of a plant where safety is important, such as a nuclear power plant, it is extremely important to prevent serious damage caused by thermal stratification.

SUMMARY

In order to solve the aforementioned problems, the present disclosure provides an apparatus for removing thermal stratification generated by turbulence penetrating into a branch pipe by using a rotation of a pipe wall.

Additional aspects will be set forth in part in the description which follows and, in part, will be apparent from the description, or may be learned by practice of the presented embodiments of the disclosure.

According to an embodiment of the present disclosure, an apparatus for removing thermal stratification generated by turbulent penetration by using a rotation of a pipe wall includes: a connection body portion including a hollow first body and a hollow second body, the first body being coupled to one side of a branch pipe, and the second body being spaced apart from the first body and connected to other side of the branch pipe; and a hollow rotating part between the first body and the second body, the rotating part rotating around a center of the branch pipe, and wherein the apparatus removes thermal stratification formed in the branch pipe branching from a main pipe through which a high-temperature fluid flows.

Also, the branch pipe may include a first branch pipe branching from the main pipe, an elbow pipe connected to the first branch pipe to change a flow direction of the high-temperature fluid, and a second branch pipe connected to the elbow pipe, wherein the first body may be between the elbow pipe and the second branch pipe.

Also, the rotating part may have a circular shape having a certain outer diameter, and the first body and the second body may each have a square shape whose one side is equal to the outer diameter of the rotating part, and the rotating part is between the first body and the second body that face each other.

Also, an inner diameter of the connection body portion and an inner diameter of the rotating part may be equal to an inner diameter of the branch pipe.

Also, the rotating part may include a ring portion, and a first connection portion and a second connection portion, the ring portion having a ring shape, and the first connection portion and the second connection portion protruding from the ring portion in opposite directions and being inserted into the first body and the second body, respectively, and a first insertion portion and a second insertion portion into which the first connection portion and the second connection portion are respectively inserted may be formed in the first body and the second body, respectively.

Also, a first protrusion and a second protrusion protruding in a direction perpendicular to a direction passing through a center of the rotating part may be provided in the first connection portion and the second connection portion, respectively, and a first insertion groove and a second insertion groove into which the first protrusion and the second protrusion are respectively inserted may be formed in the first insertion portion and the second insertion portion, respectively.

Also, protrusions may be formed to protrude and to be spaced apart from each other at certain intervals on an inner circumferential surface of the rotating part.

Also, the protrusions may be arranged at intervals of 90° on the inner circumferential surface of the rotating part.

Also, the apparatus may further include a driving part configured to rotate the rotating part, wherein the driving part may include: a pulley spaced apart from the rotating part; a power transmission member coupled to the pulley to surround the rotating part; and a power supply source configured to rotate the pulley.

Also, the first body may include: a first sub-body including a first coupling hole; a second sub-body including a second coupling hole facing the first coupling hole; and a first fastening member inserted into the first coupling hole and the second coupling hole to fasten the first sub-body to the second sub-body, and the second body may include: a third sub-body including a third coupling hole; a fourth sub-body including a fourth coupling hole facing the third coupling hole; and a second fastening member inserted into the third coupling hole and the fourth coupling hole to fasten the third sub-body to the fourth sub-body.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
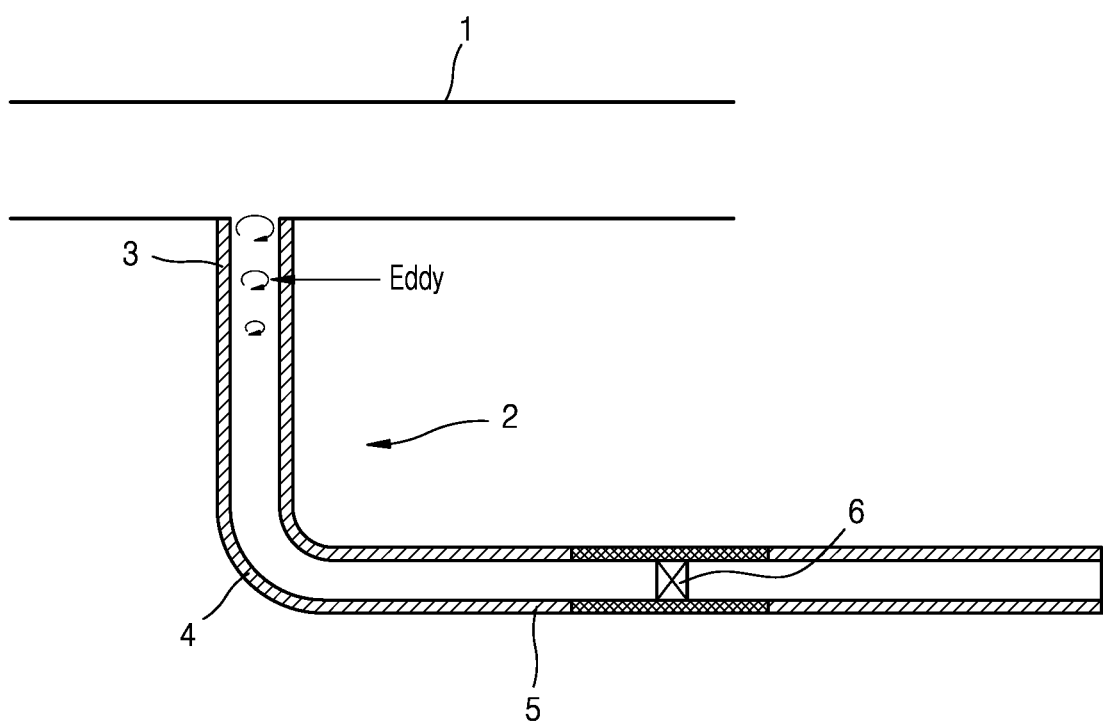
FIG. 1 is a diagram illustrating a state in which turbulence penetrates into a branch pipe.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the present disclosure will be described with reference to the accompanying drawings. As the present disclosure allows for various changes and numerous embodiments, certain embodiments will be illustrated in the drawings and described in the detailed description. However, various embodiments are not intended to limit the present disclosure to certain embodiments, and should be construed as including all changes, equivalents, and/or alternatives included in the spirit and scope of various embodiments of the present disclosure. With regard to the description of the drawings, similar reference numerals may be used to refer to similar elements.

Expressions such as "include" or "may include" that may be used in various embodiments of the present disclosure specify the presence of a corresponding function, operation, or element, and do not preclude the presence or addition of one or more functions, operations, or elements. Also, it will be understood that terms such as "include" or "comprise" as used in various embodiments of the present disclosure specify the presence of stated features, numbers, steps, operations, elements, parts, and combinations thereof, but do not preclude in advance the presence or addition of one or more other features, numbers, steps, operations, elements, parts, combinations thereof.

It will be understood that when an element is referred to as being "connected" or "coupled" to another element, it may be directly connected or coupled to the other element, or intervening elements may exist between the element and the other element. On the other hand, it will be understood that when an element is referred to as being "directly connected" or "directly coupled" to another element, intervening elements may not exist between the element and the other element.

Terms used in various embodiments of the present disclosure are merely used to describe certain embodiments, and are not intended to limit various embodiments of the present disclosure. As used herein, the singular forms "a," "an," and "the" are intended to include the plural forms as well, unless the context clearly indicates otherwise.

Unless otherwise defined, all terms used herein including technical or scientific terms have the same meanings as commonly understood by those of ordinary skill in the art to which various embodiments of the present disclosure pertain.

Terms such as those defined in commonly used dictionaries should be interpreted as having meanings consistent with the meanings in the context of the related art, and should not be interpreted in an idealized or overly formal sense, unless explicitly defined in various embodiments of the present disclosure.

Hereinafter, preferred embodiments according to the present disclosure will be described in detail with reference to the accompanying drawings.

Figure 2:
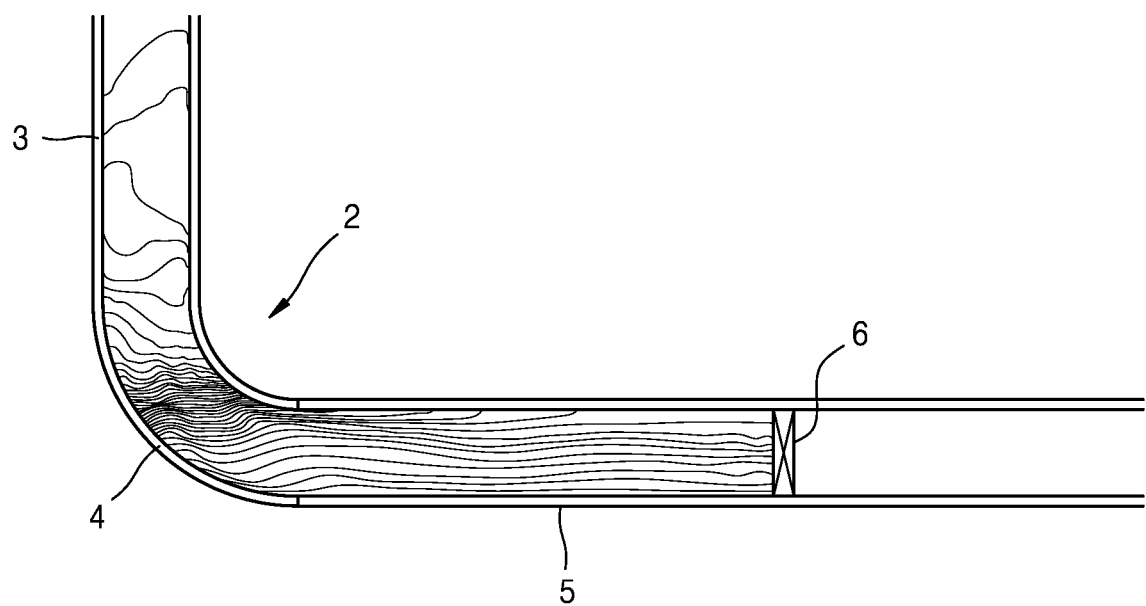
FIG. 2 is a diagram illustrating a state in which thermal stratification is formed in a branch pipe.
Figure 3:
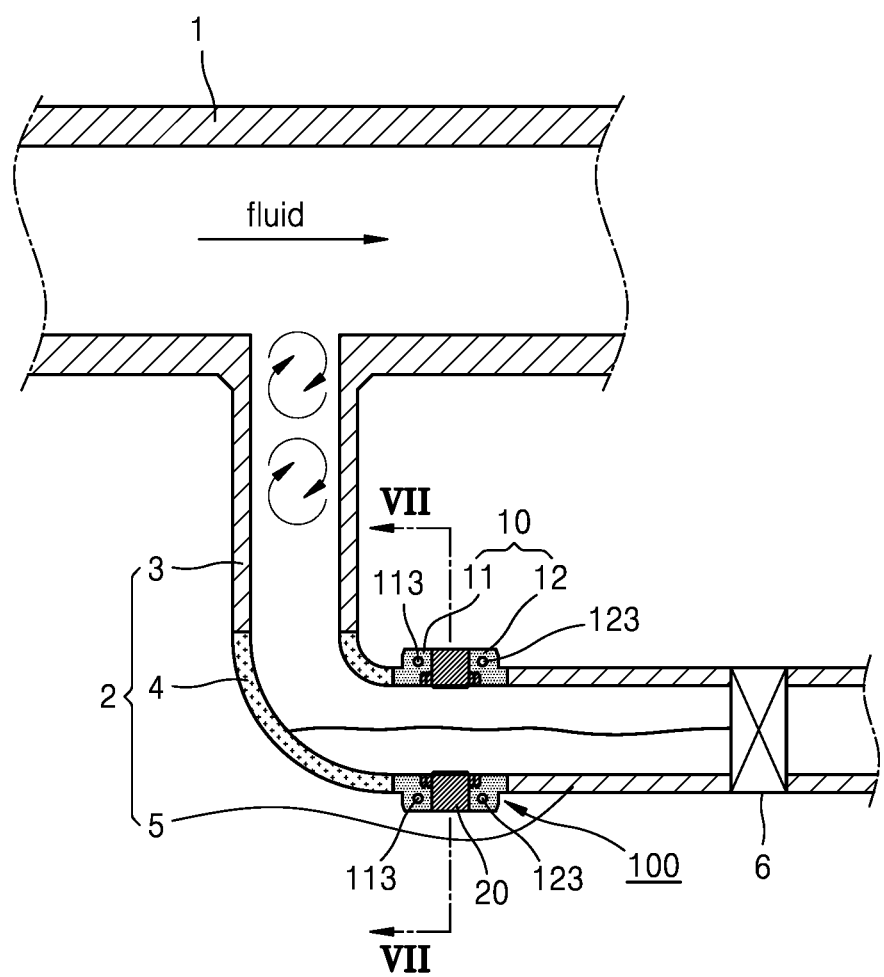
FIG. 3 is a cross-sectional view of a state in which an apparatus for removing thermal stratification is coupled to a branch pipe.
Figure 4:
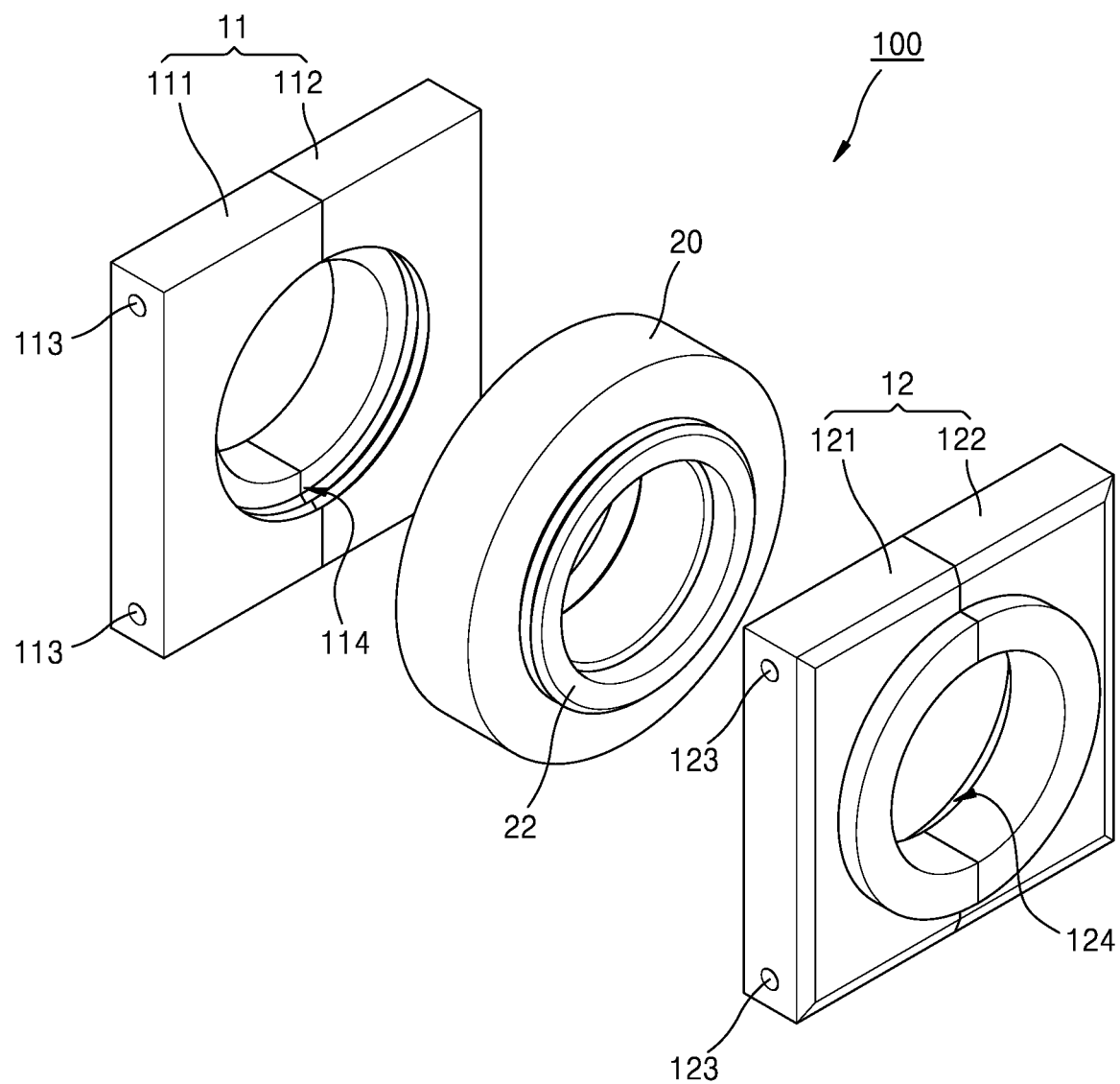
FIG. 4 is an exploded perspective view of an apparatus for removing thermal stratification.
Figure 5:
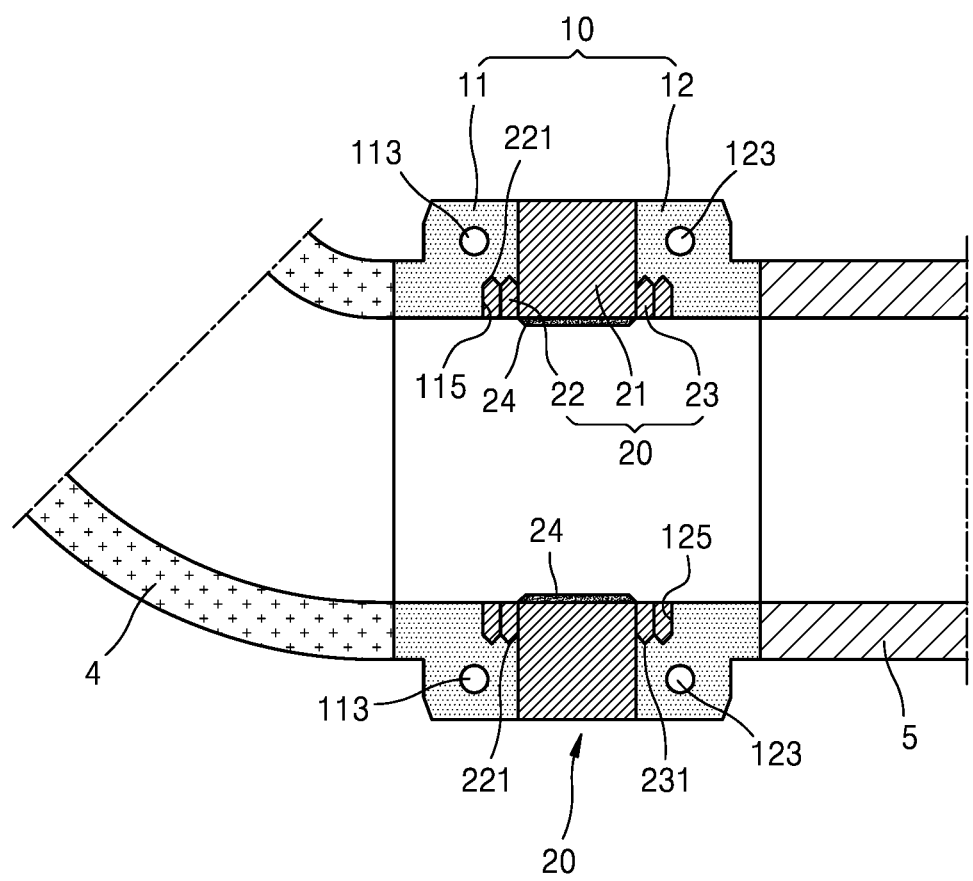
FIG. 5 is an extracted view illustrating a main part of FIG. 3.
Figure 6:
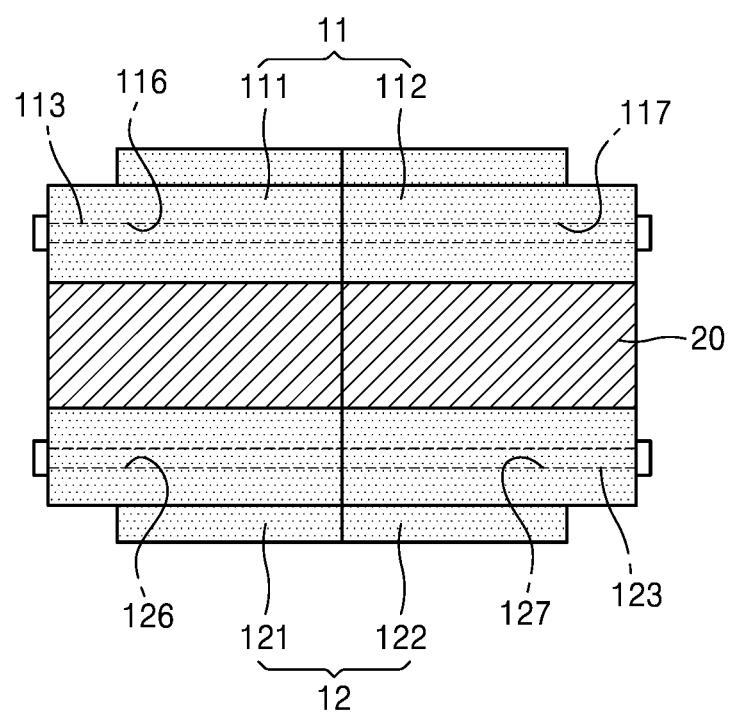
FIG. 6 is a plan view of an apparatus for removing thermal stratification.
Figure 7:
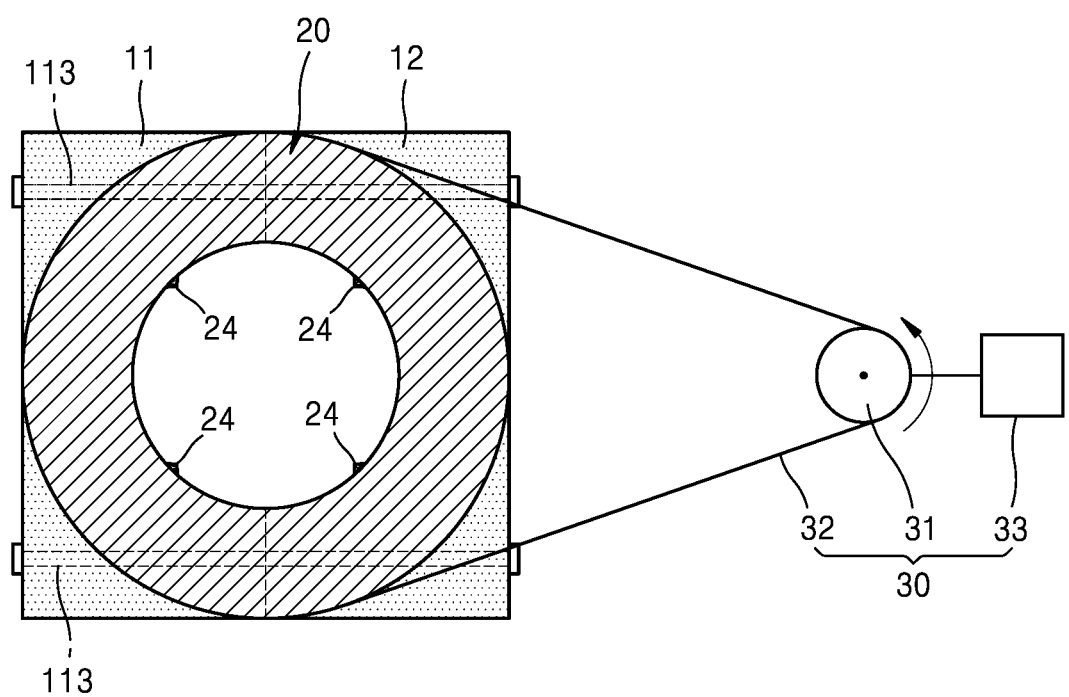
FIG. 7 is a cross-sectional view of FIG. 3 taken along line VII-VII.

FIG. 1 is a diagram illustrating a state in which turbulence penetrates into a branch pipe, and FIG. 2 is a diagram illustrating a state in which thermal stratification is formed in a branch pipe. FIG. 3 is a cross-sectional view of a state in which an apparatus for removing thermal stratification is coupled to a branch pipe, and FIG. 4 is an exploded perspective view of an apparatus for removing thermal stratification. FIG. 5 is an extracted view illustrating a main part of FIG. 3, FIG. 6 is a plan view of an apparatus for removing thermal stratification, and FIG. 7 is a cross-sectional view of FIG. 3 taken along line VII-VII.

First, an apparatus for removing thermal stratification generated by turbulent penetration by using a rotation of an pipe wall, according to the present disclosure, is an apparatus for removing thermal stratification generated in a branch pipe when a main pipe, through which a high-temperature and high-flow fluid flows, is coupled to the branch pipe that causes the flow of the fluid to branch from the main pipe, in various industrial plants. When the branch pipe is closed by a valve at the initial stage of plant operation, turbulent eddies penetrate into the dead-end branch pipe. The present disclosure provides an apparatus for removing thermal stratification generated by penetration of turbulence into the stagnant branch pipe.

Referring to FIG. 3, an apparatus 100 for removing thermal stratification generated by turbulent penetration by using a rotation of an pipe wall is an apparatus for removing thermal stratification formed in a branch pipe 2 that branches from a main pipe 1, through which a high-temperature fluid flows, and has a fluid with a flow volume less than that of the main pipe 1 flowing therethrough. According to the present embodiment, the apparatus 100 for removing thermal stratification includes a connection body portion 10 and a rotating part 20.

Referring to FIGS. 3 and 4, the connection body portion 10, which is a hollow member coupled to the branch pipe 2, includes a hollow first body 11 coupled to one side of the branch pipe 2, and a hollow second body 12 spaced apart from the first body 11 and connected to the other side of the branch pipe 2. That is, the first body 11 and the second body 12 are provided as a pair of bodies that are spaced apart from each other, and each of the first body 11 and the second body 12 is coupled to the branch pipe 2 and has a hollow shape so that a fluid may flow therein.

The rotating part 20 is between the first body 11 and the second body 12 and rotates around the center of the branch pipe 2. When the rotating part 20 rotates around the center of the branch pipe 2, it means that the rotating part 20 rotates in a circumferential direction around the center of a diameter of the branch pipe 2. The rotating part 20 is arranged between the first body 11 and the second body 12.

According to the present embodiment, an inner diameter of the rotating part 20 and an inner diameter of the connection body portion 10 are equal to an inner diameter of the branch pipe 2. Accordingly, an inner circumferential surface of the rotating part 20 and an inner circumferential surface of the connection body portion 10 form a pipe wall together with an inner circumferential surface of the branch pipe 2. The rotating part 20 rotates between the first body 11 and the second body 12 and thus acts as though the pipe wall is rotated.

According to the present embodiment, the rotating part 20 has a circular shape in which an outer circumferential surface thereof has a certain outer diameter. The outer diameter is greater than an outer diameter of the branch pipe 2. The outer diameter of the rotating part 20 is manufactured to be greater than the outer diameter of the branch pipe 2, so that the strength of a rotor is increased.

In addition, the first body 11 and the second body 12 each have a square shape in which the outer diameter of the rotating part 20 is one side, and the rotating part 20 is between the first body 11 and the second body 12 that face each other. As shown in FIG. 4, when the rotating part 20 is accommodated between the first and second bodies 11 and 12, edges of the first and second bodies 11 and 12 protrude outward than the rotating part 20, thereby preventing the rotating part 20 from being separated.

As shown in FIG. 3, according to the present embodiment, the branch pipe 2 includes a first branch pipe 3, an elbow pipe 4, and a second branch pipe 5. The first branch pipe 3 is a pipe directly connected to the main pipe 1 so that the fluid flowing through the main pipe 1 branches therefrom. The elbow pipe 4 is a curved pipe which is connected to the first branch pipe 3 and provided to change a flow direction of the fluid. The second branch pipe 5 is a pipe connected to the elbow pipe 4 to transfer the fluid branching from the main pipe 1 to a certain location, and is provided as a straight line according to the present embodiment.

In the apparatus 100 for removing thermal stratification generated by turbulent penetration by using the rotation of the pipe wall, according to the present embodiment, the branch pipe 2 including the elbow pipe 4 as described above is between the elbow pipe 4 and the second branch pipe 5.

As shown in FIG. 2, in a pipe system including the elbow pipe 4, in which the flow direction of the fluid is changed, during operation, thermal stratification is generated at a point where the elbow pipe 4 and the second branch pipe 5 extending in a straight line come into contact and affects surrounding parts. Accordingly, the apparatus 100 for removing thermal stratification according to the present disclosure is provided at a point where the elbow pipe 4 and the second branch pipe 5 come into contact, so that concentrated formation of thermal stratification may be eliminated at an initial stage. The first body 11 is coupled to the elbow pipe 4 and the second body 12 is coupled to the second branch pipe 5, and a rotating part 20 is provided to be between the first body 11 and the second body 12.

The structure and coupling relationship of the first and second bodies 11 and 12 and the rotating part 20 will be described in greater detail.

As shown in FIGS. 4 and 5, according to the present embodiment, the rotating part 20 includes a ring portion 21, a first connection portion 22, and a second connection portion 23. The ring portion 21 has a circular shape, and an inner diameter of the ring portion 21 is formed to be equal to the inner diameter of the branch pipe 2. The ring portion 21 is between the first body 11 and the second body 12. The first connection portion 22 and the second connection portion 23 protrude from the ring portion 21 in opposite directions and are inserted into the first body 11 and the second body 12, respectively. A first insertion portion 114 and a second insertion portion 124 respectively into which the first connection portion 22 and the second connection portion 23 are inserted are formed in the first body 11 and the second body 12, respectively.

In addition, a first protrusion 221 and a second protrusion 231 protruding in a direction perpendicular to a direction passing through the center of the rotating part 20 are provided in the first connection portion 22 and the second connection portion 23, respectively. As shown in FIG. 5, the first protrusion 221 and the second protrusion 231 each have a leadless screw thread shape. The first protrusion 221 and the second protrusion 231 have sawtooth structures with the same pitch height. A first insertion groove 115 and a second insertion groove 125 respectively into which the first protrusion 221 and the second protrusion 231 are inserted are formed in the first insertion portion 114 of the first body 11 and the second insertion portion 124 of the second body 12, respectively.

As shown in FIG. 5, as the ring portion 21 of the rotating part 20 is between the first body 11 and the second body 12, the first protrusion 221 is inserted into the first insertion groove 115 and the second protrusion 231 is inserted into the second insertion groove 125, so that the rotating part 20 also performs a function of binding the first and second bodies 11 and 12 in the middle. As a result, the first body 11, the rotating part 20, and the second body 12 are rotatably coupled to each other in a firmly fastened state, to enable rotation of the rotating part 20.

According to the present embodiment, the first body 11 includes a first sub-body 111, a second sub-body 112, and a first fastening member 113. The second body 12 includes a third sub-body 121, a fourth sub-body 122, and a second fastening member 123.

The first sub-body 111 and the second sub-body 112 have inner circumferential surfaces each having a semicircular shape, and the first sub-body 111 and the second sub-body 112 come into contact with and are coupled to each other. A first coupling hole 116 is formed in the first sub-body 111, and a second coupling hole 117 is formed in the second sub-body 112 to face the first coupling hole 116. The first fastening member 113 is inserted into the first coupling hole 116 and the second coupling hole 117 to fasten the first sub-body 111 to the second sub-body 112. The first fastening member 113 may pass through the first coupling hole 116 and the second coupling hole 117, and a nut may be coupled and fixed to an end of the first fastening member 113.

The third sub-body 121 and the fourth sub-body 122 have substantially the same configuration as those of the first sub-body 111 and the second sub-body 112. That is, the third sub-body 121 and the fourth sub-body 122 have inner circumferential surfaces each having a semicircular shape, and the third sub-body 121 and the fourth sub-body 122 come into contact with and are coupled to each other. A third coupling hole 126 is formed in the third sub-body 121, and a fourth coupling hole 127 facing the third coupling hole 126 is formed in the fourth sub-body 122. The second fastening member 123 is inserted into the third coupling hole 126 and the fourth coupling hole 127 to fasten the third sub-body 121 to the fourth sub-body 122. Similar to the first fastening member 113, the second fastening member 123 passes through the third coupling hole 126 and the fourth coupling hole 127, and a nut may be coupled and fixed to an end of the second fastening member 123.

According to an embodiment of the present disclosure, a driving part 30 is provided to rotate the rotating part 20.

The driving part 30 includes a pulley 31, a power transmission member 32, and a power supply source 33. The pulley 31 is spaced apart from the rotating part 20, and the power transmission member 32 is coupled to the pulley 31 to surround the rotating part 20. One side of the power transmission member 32 is wound around the rotating part 20, and the other side of the power transmission member 32 is wound around the pulley 31. According to the present embodiment, the power transmission member 32 is formed of a belt. The power transmission member 32 is not limited to the belt. The power supply source 33 is to provide a force to rotate the pulley 31 and may be, for example, a motor.

When the pulley 31 is rotated by the power supply source 33, the power transmission member 32 is rotated to rotate the rotating part 20. By the rotation of the rotating part 20, a fluid filled in the branch pipe 2 is rotated together and mixed by a frictional force.

According to the present embodiment, protrusions 24 that increase the rotation of the fluid are formed to protrude from the inner circumferential surface of the rotating part 20. When a valve 6 provided in the branch pipe 2 is open to allow the flow of the fluid, each of the protrusions 24 is formed in a size that does not affect the flow of the fluid in the branch pipe 2, for example, about 3% to about 5% of the inner diameter of the branch pipe 2.

According to the present embodiment, the protrusions 24 are formed to protrude and to be spaced apart from each other at certain intervals on the inner circumferential surface of the rotating part 20. A cross-section of each of the protrusions 24 has a substantially triangular shape and is formed to increase a rotational force of the fluid when the rotating part 20 rotates in a state in which the valve 6 is closed, and is also formed to an extent that does not interfere with the flow of the fluid and cause no pressure drop when the valve 6 is opened and the fluid flows through the second branch pipe 5. According to the present embodiment, the protrusions 24 are provided as four protrusions 24 arranged at intervals of 90° on the inner circumferential surface of the rotating part 20. The number of the protrusions 24 is not limited to four, but because the flow of the fluid may be inhibited as the number of the protrusions 24 increases, three or four protrusions 24 may be formed.

Hereinafter, the operation and effect of the apparatus 100 for removing thermal stratification generated by turbulent penetration by using the rotation of the pipe wall according to the aforementioned configuration will be described in detail.

In industrial plants, the main pipe 1 through which a high-temperature and high-flow fluid flows is provided, and the branch pipe 2 branching from the main pipe 1 to supply the fluid to a desired location is provided. According to the present embodiment, the branch pipe 2 branching from the main pipe 1 is provided by being connected in order from the main pipe 1 to the first branch pipe 3, the elbow pipe 4, and the second branch pipe 5.

When the fluid flows along the main pipe 1 and does not flow along the branch pipe 2, the valve 6 provided in the branch pipe 2 is closed, for example, at an initial stage of operation or according to necessary conditions. In this case, a turbulent penetration phenomenon occurs in which the fluid flowing along the main pipe 1 penetrates into the branch pipe 2, and thermal stratification is formed by the turbulent penetration phenomenon. As in the present embodiment, in the case of the branch pipe 2 including the elbow pipe 4, thermal stratification is actively generated at a point where the elbow pipe 4 and the second branch pipe 5 are connected, and spreads to the second branch pipe 5.

The apparatus 100 for removing thermal stratification generated by turbulent penetration by using the rotation of the pipe wall, according to the embodiment of the present disclosure, is between the elbow pipe 4 and the second branch pipe 5. According to the embodiment of the present disclosure, the apparatus 100 for removing thermal stratification is modularized and manufactured in advance, and then coupled between the elbow pipe 4 and the second branch pipe 5. The first connection portion 22 and the second connection portion 23 of the rotating part 20 are inserted into the first insertion groove 115 of the first body 11 and the second insertion groove 125 of the second body 12, respectively. In this case, the first body 11 is arranged so that the first and second sub-bodies 111 and 112 face each other, and the second body 12 is also arranged so that the third and fourth sub-bodies 121 and 122 face each other. Then, by using the first and second fastening members 113 and 123, the first and second sub-bodies 111 and 112 and the third and fourth sub-bodies 121 and 122 are fastened so that modularization is completed. The first body 11 is welded and coupled to the side of the elbow pipe 4, and the second body 12 is welded and coupled to the side of the second branch pipe 5.

One side of the power transmission member 32 is wound around the rotating part 20, and the other side of the power transmission member 32 is wound around the pulley 31. When the valve 6 that opens and closes the branch pipe 2 is closed and the fluid flows along the main pipe 1, the rotating part 20 is rotated as the power transmission member 32 is rotated by the power supply source 33, and the fluid is rotated and mixed as the rotating part 20 is rotated, so that thermal stratification at a point where the elbow pipe 4 and the branch pipe 2 are connected is removed.

As described above, the apparatus 100 for removing thermal stratification generated by turbulent penetration by using the rotation of the pipe wall, according to the embodiment of the present disclosure, efficiently removes thermal stratification generated by turbulent eddies penetrating into the branch pipe 2 closed by the valve 6.

Also, the apparatus 100 for removing thermal stratification is modularized as described above and thus may be easily installed without changing the existing pipe network, and the apparatus 100 for removing thermal stratification is between the elbow pipe 4 and the second branch pipe 5 and thus provides easy maintenance. Accordingly, the apparatus 100 for removing thermal stratification may be easily installed in plants in operation or in which construction is completed or is in progress.

When the valve 6 of the branch pipe 2 is opened and the fluid flows through the branch pipe 2, in the apparatus 100 for removing thermal stratification according to the present disclosure, a separate structure is not installed inside a pipe, which does not interfere with the flow of the fluid, and thus, pressure loss does not occur. Also, because scattered materials are not generated due to damage of the separate structure, additional device damage due to the scattered materials may be prevented in advance, and when the apparatus 100 for removing thermal stratification is applied to a nuclear power plant, safety may be greatly improved.

The apparatus 100 for removing thermal stratification according to the present disclosure may sufficiently remove thermal stratification without rotating the rotating part 20 at a high speed. For example, a sufficient effect may be achieved at a speed of about 10 revolutions/minute to about 13 revolutions/minute (10 rpm to 13 rpm). Also, when the valve 6 of the branch pipe 2 is opened and the fluid flows through the branch pipe 2, the apparatus 100 for removing thermal stratification according to the present disclosure may be stopped, so that a large electric load is not required for the operation.

In addition, because the thermal stratification is blocked in advance, a pipe integrity evaluation on thermal stratification or thermal fatigue through experiments or computational analysis may be omitted, and because there is no need to install an ultrasonic monitoring facility or the like to check the condition of the inside of a pipe, costs required for facilities may be reduced.

The apparatus for removing thermal stratification generated by turbulent penetration by using the rotation of the pipe wall, according to the present disclosure, may remove thermal stratification generated by turbulence penetrating into a branch pipe by using the rotation of the pipe wall.

Also, when the pipe wall is rotated, a viscous fluid is rotated together by a frictional force with the rotating pipe wall to remove thermal stratification, so that the thermal stratification may be removed with a relatively small rotational force, and pipe vibration or the like may not be affected.

In addition, the apparatus for removing thermal stratification may be modularized and installed, and thus, installation thereof is possible without changing the layout of the existing pipe network.

Moreover, when the branch pipe includes a first branch pipe, an elbow pipe, and a second branch pipe, during operation, thermal stratification starts at a point where the elbow pipe and the second branch pipe are connected, the apparatus for removing thermal stratification according to the present disclosure is installed at the point where the elbow pipe and the second branch pipe are connected and efficiently removes the thermal stratification with a small rotational force in the initial stage.

Also, because a separate structure colliding with a fluid in the pipe to remove thermal stratification is not installed, the fluid may smoothly flow to prevent pressure drop loss due to the separate structure in advance. Further, because the separate structure is not installed, not only costs may be reduced, but also device damage caused by the separate structure being damaged by the flow of the fluid may be prevented. That is, when the structure is damaged due to the flow of the fluid, fragments may be generated, and the fragments may cause serious damage not only to the pipe system but also to other devices into which the fluid flows. The present disclosure may prevent such damage. When the present disclosure is applied to a nuclear power plant, accidents caused by the fragments may be prevented, thereby greatly improving safety.

Also, because thermal stratification generated in the branch pipe is removed in advance, the installation of ultrasonic monitoring equipment for pipe integrity evaluation may be omitted, thereby reducing enormous costs required for such equipment.

It should be understood that embodiments described herein should be considered in a descriptive sense only and not for purposes of limitation. Descriptions of features or aspects within each of the embodiments should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for removing thermal stratification generated by turbulent penetration by using a rotation of a pipe wall, which is provided for removing thermal stratification formed in a branch pipe branching from a main pipe through which a high-temperature fluid flows, wherein, the branch pipe includes a first branch pipe branching from the main pipe, an elbow pipe connected to the first branch pipe to change a flow direction of the high-temperature fluid, and a second branch pipe connected to the elbow pipe, wherein the apparatus is between the elbow pipe and the second branch pipe, the apparatus comprising:

a connection body portion including a hollow first body and a hollow second body, the first body being coupled to the elbow pipe, and the second body being spaced apart from the first body and connected to the second branch pipe;

a hollow rotating part accommodated between the first body and the second body, the rotating part rotating around a center of the branch pipe, and a driving part configured to rotate the rotating part, wherein the rotating part has a circular shape having a certain outer diameter, and the first body and the second body each have a square shape, and each of the first body and the second body has a side length equal to the outer diameter of the rotating part, wherein edges of the first body and second body protrude outward than the rotating part, preventing the rotating part from being separated from the first body and the second body, and the rotating part is between the first body and the second body that face each other, wherein protrusions are formed to protrude and to be spaced apart from each other at certain intervals on an inner circumferential surface of the rotating part, wherein the protrusions are arranged at intervals of 90° on the inner circumferential surface of the rotating part, wherein the driving part includes:

a pulley spaced apart from the rotating part;

a power transmission member coupled to the pulley to surround the hollow rotating' part; and a power supply source configured to rotate the pulley.

2. The apparatus of claim 1, wherein an inner diameter of the connection body portion and an inner diameter of the rotating part are equal to an inner diameter of the branch pipe.

3. The apparatus of claim 1, wherein the rotating part includes a ring portion, and a first connection portion and a second connection portion, the ring portion having a ring shape, and the first connection portion and the second connection portion protruding from the ring portion in opposite directions and being inserted into the first body and the second body, respectively, and a first insertion portion and a second insertion portion into which the first connection portion and the second connection portion are respectively inserted are formed in the first body and the second body, respectively.

4. The apparatus of claim 3, wherein a first protrusion and a second protrusion protruding in a direction perpendicular to a direction passing through a center of the rotating part are provided in the first connection portion and the second connection portion, respectively, and a first insertion groove and a second insertion groove into which the first protrusion and the second protrusion are respectively inserted are formed in the first insertion portion and the second insertion portion, respectively.

5. The apparatus of claim 1, wherein the first body includes:
- a first sub-body including a first coupling hole;
- a second sub-body including a second coupling hole facing the first coupling hole; and
- a first fastening member inserted into the first coupling hole and the second coupling hole to fasten the first sub-body to the second sub-body, and the second body includes:
- a third sub-body including a third coupling hole;
- a fourth sub-body including a fourth coupling hole facing the third coupling hole; and
- a second fastening member inserted into the third coupling hole and the fourth coupling hole to fasten the third sub-body to the fourth sub-body.

\* \* \* \* \*